(12) United States Patent
Dutta et al.

(10) Patent No.: US 10,726,060 B1
(45) Date of Patent: Jul. 28, 2020

(54) CLASSIFICATION ACCURACY ESTIMATION

(71) Applicant: Amazon Technologies, Inc., Seattle, WA (US)

(72) Inventors: Archiman Dutta, Kirkland, WA (US); Shoubhik Bhattacharya, Seattle, WA (US); Subhadeep Chakraborty, Seattle, WA (US); Deepak Kumar Nayak, Seattle, WA (US); Nathan Rose, Seattle, WA (US); Avik Sinha, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1173 days.

(21) Appl. No.: 14/749,554

(22) Filed: Jun. 24, 2015

(51) Int. Cl.
  *G06F 16/35*  (2019.01)
  *G06Q 30/06*  (2012.01)
  *G06N 20/00*  (2019.01)
  *G06F 16/28*  (2019.01)

(52) U.S. Cl.
  CPC .......... *G06F 16/353* (2019.01); *G06F 16/285* (2019.01); *G06N 20/00* (2019.01); *G06Q 30/0601* (2013.01)

(58) Field of Classification Search
  None
  See application file for complete search history.

(56) References Cited

U.S. PATENT DOCUMENTS

| | | | | |
|---|---|---|---|---|
| 6,233,575 B1 * | 5/2001 | Agrawal | .............. | G06F 17/3071 |
| 6,606,603 B1 * | 8/2003 | Joseph | ................. | G06Q 10/087 |
| | | | | 705/1.1 |
| 7,082,426 B2 * | 7/2006 | Musgrove | ......... | G06F 17/30864 |
| 7,406,436 B1 * | 7/2008 | Reisman | ................ | G06Q 30/02 |
| | | | | 705/7.32 |
| 7,904,348 B2 * | 3/2011 | Johnson | .................. | G06Q 30/02 |
| | | | | 705/26.2 |
| 8,655,737 B1 * | 2/2014 | Tromble | ................ | G06Q 30/00 |
| | | | | 705/1.1 |
| 8,719,197 B2 * | 5/2014 | Schmidtler | ............ | G06Q 10/10 |
| | | | | 706/20 |
| 8,788,372 B2 * | 7/2014 | Kettner | .............. | G06Q 30/0203 |
| | | | | 705/28 |
| 9,286,391 B1 * | 3/2016 | Dykstra | ............ | G06F 17/30864 |
| 9,390,378 B2 * | 7/2016 | Garera | ................. | G06N 99/005 |
| 9,870,582 B2 * | 1/2018 | Callanta | ............. | G06Q 30/0623 |

(Continued)

*Primary Examiner* — Belix M Ortiz Ditren
*Assistant Examiner* — Melissa M. Ohba
(74) *Attorney, Agent, or Firm* — Thorpe North & Western, LLP

(57) ABSTRACT

A technology for determining accuracy estimates for classifications used in an electronic catalog. In one example, classifications for product groupings included in an electronic catalog may be updated as a result of the classifications inaccurately representing products included in the product groupings. The electronic catalog of products may be grouped into a plurality of product groupings using classifications. Classifications of product groupings that inaccurately represent products included in the product grouping may be updated with suggested classifications. Update metrics for updates made to the grouping classifications may be collected and the update metrics may be used to calculate an accuracy estimate for the classifications used in the electronic catalog.

18 Claims, 10 Drawing Sheets

(56) References Cited

U.S. PATENT DOCUMENTS

| | | | | |
|---|---|---|---|---|
| 2003/0200050 | A1* | 10/2003 | Sharma | F24F 11/62 |
| | | | | 702/132 |
| 2003/0233350 | A1* | 12/2003 | Dedhia | G06F 17/30705 |
| 2005/0028109 | A1* | 2/2005 | Richards | A43B 3/0078 |
| | | | | 715/823 |
| 2009/0319629 | A1* | 12/2009 | de Guerre | G06Q 10/107 |
| | | | | 709/206 |
| 2010/0082697 | A1* | 4/2010 | Gupta | G06F 17/30705 |
| | | | | 707/802 |
| 2012/0158458 | A1* | 6/2012 | Carter, III | G06Q 30/06 |
| | | | | 705/7.31 |
| 2012/0254333 | A1* | 10/2012 | Chandramouli | G06F 17/27 |
| | | | | 709/206 |
| 2013/0311473 | A1* | 11/2013 | Safovich | G06Q 10/10 |
| | | | | 707/738 |
| 2014/0214632 | A1* | 7/2014 | Garera | G06Q 10/087 |
| | | | | 705/28 |
| 2014/0214841 | A1* | 7/2014 | Garera | G06F 17/30598 |
| | | | | 707/739 |
| 2014/0279245 | A1* | 9/2014 | Callanta | G06Q 30/0623 |
| | | | | 705/26.61 |
| 2014/0280166 | A1* | 9/2014 | Bryars | G06F 17/30707 |
| | | | | 707/738 |

* cited by examiner

900

┌─────────────────────────────────────────────────────────────┐
│ Identify an electronic catalog of products grouped into a plurality of │
│ product groupings using classifications, where a classification is │
│ common among products included in an product grouping │
└─────────────────────────────────────────────────────────────┘ — 910

↓

┌─────────────────────────────────────────────────────────────┐
│ Update classifications of product groupings included in the plurality of │
│ product groupings with suggested classifications as a result of the │
│ classifications inaccurately representing products included in the │
│ product groupings │
└─────────────────────────────────────────────────────────────┘ — 920

↓

┌─────────────────────────────────────────────────────────────┐
│ Collect update metrics for updates made to the classifications of the │
│ product groupings │
└─────────────────────────────────────────────────────────────┘ — 930

↓

┌─────────────────────────────────────────────────────────────┐
│ Calculate an accuracy estimate for the electronic catalog where the │
│ accuracy estimate is based at least in part on using the update │
│ metrics to identify a number of classifications that were updated │
│ representing an inaccurate portion of the electronic catalog │
└─────────────────────────────────────────────────────────────┘ — 940

FIG. 9

CLASSIFICATION ACCURACY ESTIMATION

BACKGROUND

A business participating in electronic commerce may maintain an electronic catalog of products offered to customers of the business. Products included in the electronic catalog may be organized into a hierarchy of classifications representing a collection of products having similar attributes. As such, a classification in the electronic catalog may represent a group of products and not the products themselves. A tree data structure may be used to organize products in an electronic catalog into a hierarchy of classifications, where each classification may be a node in the tree data structure. Customers may browse the various nodes of the tree data structure to view products included in the nodes.

An electronic catalog may be audited to determine an accuracy of the classifications used to categorize products included in the electronic catalog. Periodically, a sample of products may be selected from the electronic catalog and evaluated by human auditors to determine the correctness of classifications assigned to the products. Based on the findings of the human auditors, an accuracy estimate (e.g., a percentage estimation of accuracy) representing a correctness of classifications assigned to the products in the electronic catalog may be calculated for the electronic catalog.

BRIEF DESCRIPTION OF THE DRAWINGS

FIG. 9 is a flow diagram that illustrates an example method for calculating accuracy estimates for classifications used in an electronic catalog.

DETAILED DESCRIPTION

Figure 1:
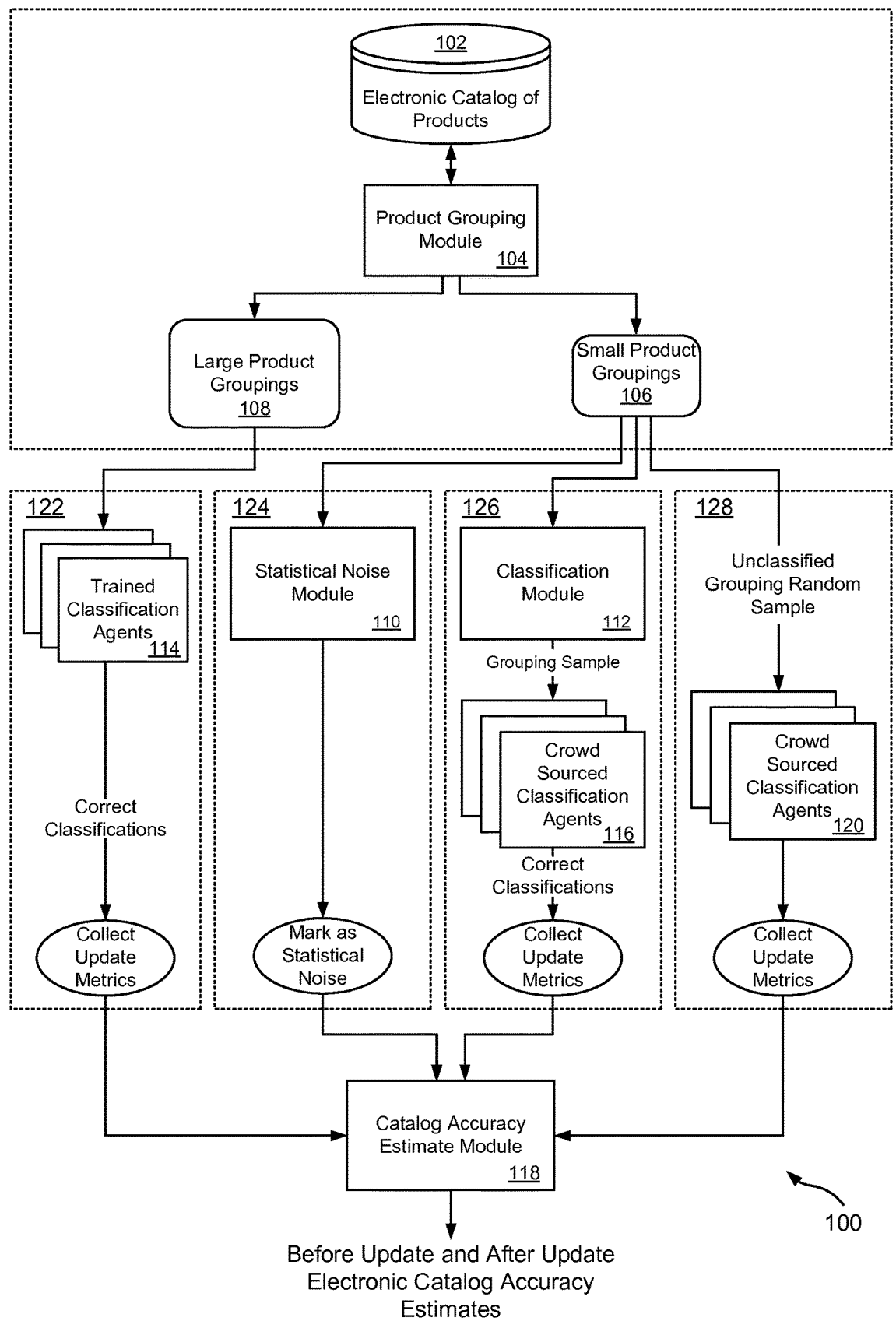
FIG. 1 is a block diagram illustrating an example system for estimating an accuracy of classifications for products included in an electronic catalog of products.

A technology is described for estimating an accuracy of classifications for products included in an electronic catalog. In one example configuration, an electronic catalog of products (e.g., items and/or services) may be divided into a plurality of product groupings using grouping terms that may be based on keywords, product titles, product descriptions, product images, etc. The resulting product groupings may be of various grouping sizes according to a product membership of the product groupings. The product groupings may then be allocated for evaluation and update of the classifications of the product groupings. In one example, the product groupings may be allocated according to the grouping sizes of the product groupings. For example, product groupings that have a larger grouping size as compared to other product groupings may be allocated to trained classification agents (e.g., expert rules, artificial intelligence rules, heuristic rules, or human classification agents having product classification training), and product groupings having a smaller grouping size as compared to other product groupings may be allocated to crowd sourced classification agents (e.g., crowd sourced human classifiers). The trained and crowd sourced classification agents may determine the accuracy of the classifications and may update classifications that may be inaccurate.

Update metrics for updates made to the classifications may be captured and stored for use in calculating an accuracy estimate for the electronic catalog (i.e., the accuracy of the classifications for the electronic catalog). More specifically, corrections made to classifications may be recorded and saved to the update metrics. A before update accuracy estimate and an after update accuracy estimate may be calculated for the electronic catalog using in part the update metrics. In calculating the before update accuracy estimate, the update metrics may be used to identify classifications that were updated by the trained and/or the crowd sourced classification agents representing an inaccurate portion of the electronic catalog prior to the classifications being updated. In calculating the after update accuracy estimate, the update metrics may be used to identify classifications that were updated by the trained and/or crowd sourced classification agents representing an accurate portion of the electronic catalog after the update of the classifications.

As a simplified illustration, grouping products included in an electronic catalog may result in a large product grouping having a classification of "athletic shoes" and a small product grouping having a classification of "women's backpacks". The large product grouping may be allocated to a trained classification agent who may evaluate the classification and determine that the classification "athletic shoes" inaccurately represents the product group because the product group primarily includes dress shoes. Likewise the small product grouping may be allocated to a crowd sourced classification agent who may determine that the classification "women's backpacks" is incorrect because the product group mostly includes women's handbags. The classifications for the large product grouping and the small product grouping may be updated (corrected) with classifications that better represent the products included in the product groupings (e.g., "dress shoes" and "women's handbags" respectively). Corrections made to the product groupings may be recorded to update metrics and used to calculate accuracy estimates for the electronic catalog.

In the past, calculating an accuracy estimate for classifications of an electronic catalog has been performed by auditors that would evaluate a sample of products in an electronic catalog to determine a correctness of classifications assigned to the products, and then calculate an accuracy estimate based the correctness of the classifications. Although the auditors would evaluate the classifications for correctness, the auditors did not update inaccurate classifications. As a result of the present technology, classifications may be evaluated by classification agents (trained and/or crowd sourced classification agents) and inaccurate classifications may be updated by the classification agents with accurate classifications. Update metrics associated with updating classifications may be collected and used to calculate an accuracy estimate, thereby eliminating the need for auditors to evaluate the correctness of classifications assigned to products in an electronic catalog.

FIG. 1 is a diagram illustrating a high level example of a system 100 that may be used to estimate an accuracy of classifications assigned to products included in an electronic catalog 102 of products. In particular, a before update accuracy estimate and an after update accuracy estimate may be calculated for classifications used in an electronic catalog 102 of products. In one example, an electronic catalog of products 102 may contain information for items and/or services offered for sale by an electronic retailer. In other examples, the electronic catalog 102 may be associated with entities that may include product distributors, physical retail stores, schools, and libraries. Classifications used in an electronic catalog 102 may be terms and/or descriptions used to identify a group of products that have one or more attributes in common.

In one example, determining a before and after accuracy estimate for an electronic catalog of products 102 may be accomplished by dividing the electronic catalog 102 into a plurality of product groupings. The products may be grouped (i.e., using search keywords) at any level of abstraction using keywords, product titles, product descriptions, product images, or other product attributes. As an illustration, products may be grouped using keywords, such as shirts, women's shirts, men's shirts, women's long sleeve shirts, men's long sleeve shirts, or any other grouping classification. Alternatively, existing classifications may be used to divide the electronic catalog 102 into a plurality of product groupings.

As illustrated, a products grouping module 104 may be configured to group products included in the electronic catalog 102 using grouping terms (e.g., keyword, product title, or other product attribute) provided by a user (e.g., an electronic catalog administrator), or using predetermined grouping terms (e.g., a classification library of grouping terms). The electronic catalog 102 may be queried using the grouping terms, and in response to the query, product information (e.g., product title, description, image, etc.) for products included in the electronic catalog 102 corresponding to the grouping terms may be returned. For example, querying the electronic catalog 102 using the keyword "shirt" may return products (i.e., product detail information for products, such as a photo, title, description, etc.) having attributes corresponding with the keyword "shirt".

Products identified by the query may be included in a product grouping and a grouping classification for the product grouping may be identified. As an example, a grouping classification assigned to a majority of products in a product grouping may be identified and used to represent all products in the product grouping. Other classifications assigned to the products in the product grouping may be identified as possible or suggested classifications.

Product groups may be of various sizes. More specifically, a number of products included in a product grouping may determine a size of the product grouping. In one example, product groupings may be allocated for evaluation of the correctness of grouping classifications according to a grouping size of the product groupings. In other examples, product groupings may be allocated using other methods, such as allocating product groups according to an expected level of difficulty to evaluate classifications for product groupings or allocating product groupings according to classification rankings used to rank an accuracy importance of a product grouping.

In the example illustrated, product groupings may be identified as large product groupings 108 and small product groupings 106. Large product groupings 108 may be allocated 122 to trained classification agents 114 for evaluation and correction of the grouping classifications. Illustratively, trained classification agents 114 may be humans that have experience in evaluating whether a classification accurately represents products included in a product grouping and have experience selecting a classification to replace an inaccurate classification. In other examples, a trained classification agent 114 may be software (e.g., a machine learning model) configured to evaluate the correctness of classifications for product groupings and update inaccurate classifications.

In the case that trained classification agents 114 may be humans, a trained classification agent 114 may be presented with a classification for a large product grouping 108. Product information (product titles, product descriptions, product images, etc.) for products included in the large product grouping 108 may be provided to the trained classification agent 114, who may then make a determination whether the classification corresponds with the product information for the products included in the large product grouping 108.

In the case that a determination is made that the classification does not correspond with the products included in the large product grouping 108, the trained classification agent 114 may, in one example, select a new classification. For example, one or more suggested grouping classifications may be presented to a trained classification agent 114 who may select a suggested grouping classification for a large product grouping 108. In another example, a trained classification agent 114 may propose a new grouping classification for a large product grouping 108, such as in the case that suggested grouping classifications may not accurately describe the large product grouping 108, or in the case that accurate grouping classifications are not provided to the trained classification agent 114.

A change made to a classification for a large product grouping 108 may be captured for use in calculating accuracy estimates for the electronic catalog 102. More specifically, update metrics for updates made to grouping classifications may be collected, such that classification updates for large product groupings 108 made by trained classification agents 114 may be recorded to an update record that stores the update metrics. The update metrics for large product groupings 108 may be used along with update metrics associated with small product groupings 106 to calculate a before update accuracy estimate and an after update accuracy estimate for the electronic catalog 102, as described later.

In one example configuration, product groupings identified as small product groupings 106 may be allocated using the following method. First, the small product groupings 106 may allocated 124 for analysis to identify small product groupings 106 having products that do not fit well within a product hierarchy of the electronic catalog 102. For example, a product hierarchy that may be represented using a tree data structure may include some small product groupings 106 may be represented as leaf nodes attached to the root node that have no children nodes. For example, the leaf nodes may be keyword searchable within the electronic catalog 102, but may not be browsable by following a root node down a tree data structure to view products included in the small product groupings 106. The small product groupings 106 identified as leaf nodes attached to the root node may account for a small percentage of the electronic catalog 102 and therefore, classifications for the small product groupings 106 may not be evaluated due to a lack of cost effectiveness. As such, the classifications for these small product groupings 106 may be recorded as inaccurate (e.g., statistical noise) in update metrics used to calculate accuracy estimates for the electronic catalog 102.

As illustrated, a statistical noise module 110 may be used to analyze and identify small product groupings 106 that may be dissimilar to classifications of neighboring product groupings in a data structure (e.g., a tree data structure). In one example, small product groupings 106 contained within leaf nodes may be identified and classifications for the small product groupings 106 may be recorded as inaccurate in the update metrics. The small product groupings 106 that are identified as having statistically incorrect classifications may be removed from a set of small product groupings, and therefore may not be allocated for evaluation and correction of classifications.

Next a set of the small product groupings 106 may be allocated 126 to a classification module 112 used to classify the small product groupings 106. In one example, the classification module 112 may use a machine learning model (e.g., a classifier) to classify the small product groupings 106. Classifications generated by the machine learning model may replace classifications previously assigned to the small product groupings 106.

Having generated classifications for the small product groupings 106, a random sample of the small product groupings 106 may be selected and allocated to crowd sourced classification agents 116. In one example, the crowd sourced classification agents 116 may be humans that have contracted with an electronic retailer or other entity that owns an electronic catalog of products to evaluate classifications for the random sample of the small product groupings 106. Illustratively, the crowd sourced classification agents 116 may contract with an electronic retailer by way of an electronic crowd sourcing marketplace. For example, the electronic retailer may post a classifying task to the electronic crowd sourcing marketplace and a crowd sourced classification agent 116 may accept to perform the classifying task for an agreed upon payment (e.g. a micro-payment).

The crowd sourced classification agents 116 may evaluate the classifications generated by the machine learning model to determine whether the classifications accurately represent products included in the small product groupings 106. For example, the crowd sourced classification agents 116 may use a graphical user interface to view products included in small product groupings 106 and classifications assigned to the small product groupings 106. The crowd sourced classification agents 116 may evaluate the correctness of the classifications and the evaluations may then be submitted via the graphical user interface.

In one example, the crowd sourced classification agents 116 may evaluate classifications for the small product groupings 106 for correctness (e.g., a classification may be marked as correct or incorrect) and the product groupings may be revaluated by trained classification agents 114. In another example, the crowd sourced classification agents 116 may determine the correctness of classifications for the small product groupings 106 and provide a suggested classification (e.g., select a suggested classification). Updates made to the classifications may be recorded to update metrics and may be used in calculating accuracy estimates for the electronic catalog 102.

Alternatively, the allocation 126 of small product groupings 106 to the classification module 112 may result in programmatically evaluating the accuracy of classifications for the small product groupings 112. For example, a machine learning model may be used to classify the small product groupings 106 and the classifications generated by the machine learning model may be compared with the grouping classifications for the small product groupings 106 to determine whether the classifications generated by the machine learning model correspond with the grouping classifications of the small product groupings 106. In the event that a generated classification does not correspond with a grouping classification, update metrics used to calculate accuracy estimates for the electronic catalog 102 may be updated to indicate that the grouping classification may be incorrect.

The final allocation 128 of small product groupings 106 may be a random sample of small product groupings 106 that have not been classified using the classification module 112 as described above. The random sample of small product groupings 106 may have classifications that were previously assigned (e.g., default or vendor assigned classifications). The random sample of small product groupings 106 may be allocated to crowd sourced classification agents 120 for evaluation of the classifications. The crowd sourced classification agents 120 may evaluate the correctness of the classifications and update inaccurate classifications, and updates to the classifications may be recorded to the update metrics used to calculate accuracy estimates for the electronic catalog 102.

The allocations 122-128 described above may be optionally performed according to various examples. For example, one or more of the allocations 122-128 may be performed, while one or more of the allocations 122-128 may optionally not be performed. Further, an order in which the allocations 122-128 are performed may be in any order and are not limited to the order described above.

Having collected update metrics associated with the correctness of classifications for the large product groupings 108 and/or the small product groupings 106, the accuracy estimates for the electronic catalog 102 may be calculated using the update metrics as opposed to performing separate catalog accuracy audits. In one example, both a before update accuracy estimate and an after update accuracy estimate may be calculated using in part the update metrics. For example, a before update accuracy estimate may be calculated using in part the update metrics to identify a number of classifications that were updated. The classifications that were updated may represent an inaccurate portion of the electronic catalog prior to the classifications being updated. As such, the inaccurate portion of the electronic catalog 102 that existed prior to correcting classifications can be identified and used to calculate a before update accuracy estimate for the electronic catalog.

Similarly, an after update accuracy estimate may be calculated using in part the update metrics to identify the number of classifications that were updated, where the updated classifications may represent an accurate portion of the electronic catalog after the classifications were updated. The updated portion of the electronic catalog 102 may represent an improvement in classification accuracy of the electronic catalog 102. As such, the after update accuracy estimate may be calculated based on the improvement of classification accuracy.

As illustrated, accuracy estimates for classifications of product groupings may be produced using a catalog accuracy estimate module 118. In one example, before and after update accuracy estimates may be calculated for the allocation 122 of the large product groupings 108 and each of the allocations 124-128 of the small product groupings 106, and overall before and after update accuracy estimates may then be calculated using the accuracy estimates associated with the individual allocations 122-128.

As an illustration, a first accuracy estimate may be calculated based in part on a first set of update metrics associated with the allocation 122 of large product groupings 108. A second accuracy estimate may be based in part on a second set of update metrics associated with the allocation 124 of small product groupings 106 determined to be statistically incorrect (e.g., the second accuracy estimate may be 0% accurate). A third accuracy estimate may be calculated for the allocation 126 of small product groupings 106 to the classification module 112 and the crowd sourced classification agents 116. And a fourth accuracy estimate may be calculated for the allocation 128 of the unclassified small product groupings 106 to the crowd sourced classification agents 120. An overall accuracy estimate (e.g., overall before and/or after update accuracy estimates) may then be calculated based in part on the first, second, third and fourth accuracy estimate.

In another example, overall before and after update accuracy estimates may be calculated using collected update metrics associated with the various allocations 122-128 without regard to which update metrics are associated with which allocation 122-128. For example, the collection of update metrics may be evaluated as a single set of update metrics (e.g., the update metrics for all allocations 122-128 may be used to determine how many product groupings 106, 108 were evaluated and determine how many classification updates were performed for the product groupings 106, 108), and overall before and after update accuracy estimates may be calculated based in part on the set of update metrics.

Figure 2:
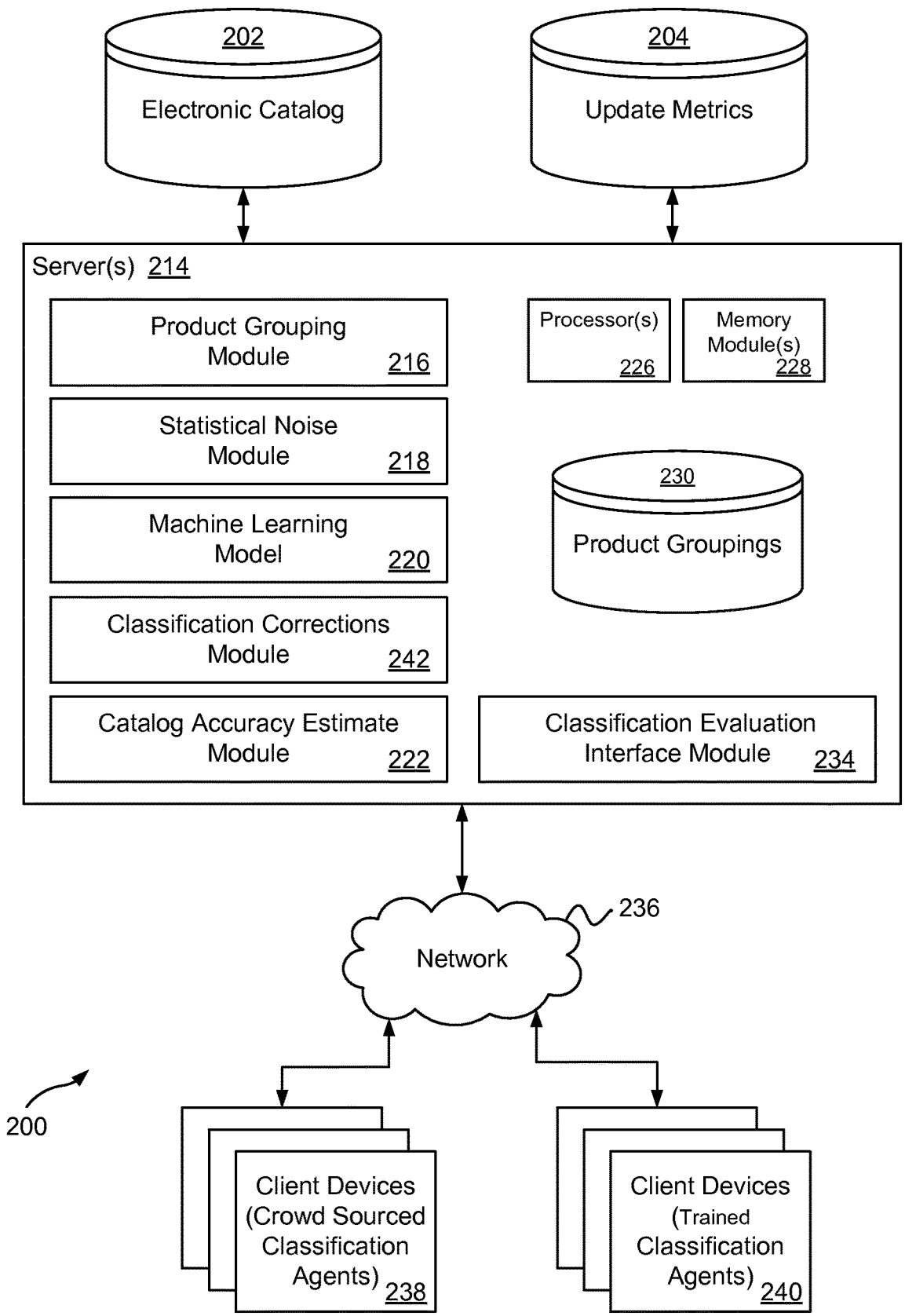
FIG. 2 is a block diagram that illustrates various example components included in a system for evaluating and updating classifications and calculating an accuracy estimate for classifications used in an electronic catalog.

FIG. 2 illustrates components of an example system environment 200 on which the present technology may be executed. The system environment 200 may include a server(s) 214 used to allocate product groupings jobs or projects to classification agents for evaluation and update of classifications used in the electronic catalog 202. The server(s) 214 also includes modules used in evaluating the accuracy of the classifications for the electronic catalog 202.

The server(s) 214 may include a product grouping module 216, a statistical noise module 218, a machine learning model 220, a classification corrections module 242, and a catalog accuracy estimate module 222. The product grouping module 216 may be configured to group products included in the electronic catalog 202 that have similar attributes. For example, a similarity measure may be used to identify products having similar customer facing product attributes (e.g., product attributes shown to customers using an electronic retail marketplace). For example, products (i.e., product attributes) included in the electronic catalog 202 may be analyzed using cluster analysis, resulting in the creation of a plurality of product groupings 230.

The product groupings 230 may have been assigned classifications that generally describe the products included in the product groupings 230. For example, a product grouping 230 may be expected to have a classification that may be common among most products included in the product grouping 230.

Product groupings 230 created using the product grouping module 216 may be analyzed to determine a product membership for each of the product groupings 230 (i.e., a number of products included in a product grouping 230). Based on the product membership of a product grouping 230, the product groupings 230 may be categorized by size and allocated to classification agents for evaluation of classifications associated with each product grouping 230. For example, the product groupings 230 may be categorized as large product groupings and small product groupings, and the product groupings 230 may be allocated to classification agents according to the size of the product groupings 230.

In one example, selected product groupings 230 (e.g., small product groupings) may be assigned generated classifications using the machine learning model 220, which may be configured to generate the classifications for the selected product groupings 230. Example machine learning models may include a support vector machine model, a naïve Bayes model, a logistic regression model, or a decision trees model. The selected product groupings 230 or a sample of the selected product groupings 230 may be allocated to the classification agents (e.g., crowd sourced classification agents) for evaluation of the generated classifications. Updates made to the generated classifications by the classification agents may be recorded to update metrics 204 stored in a data store for use in calculating accuracy estimates for classifications used in the electronic catalog 202.

The statistical noise module 218 may be configured to identify products in the electronic catalog 202 that have classifications that are dissimilar to classifications of neighbor products within a classification hierarchy. For example, a tree data structure used to represent a hierarchy of classifications for the electronic catalog 202 may contain leaf nodes attached to the root node of the tree that are dissimilar from other neighboring nodes in the tree data structure. In one example, the products identified as having dissimilar classifications may be removed from the product groupings 230 so that the products are not allocated to the classification agents for evaluation. Classifications for the identified products may be recorded in update metrics 204 as being statistically inaccurate classifications.

The classification corrections module 242 may be configured to recognize an update made to a product grouping 230, which results in a correction to the classification for the product grouping 230. More specifically, when evaluating classifications for product groupings, trained classification agents and crowd sourced classification agents may select a classification for a product grouping that appears to be correct without having knowledge of the currently assigned classification. In the case that a classification selected by a classification agent (e.g., a trained classification agent or a crowd sourced classification agent) differs from a currently assigned classification, the classification selected by the classification agent may be used to replace the currently assigned classification. The classification corrections module 242 may be configured to compare a currently assigned classification for a product grouping 230 with a classification selected by a trained classification agent, a crowd sourced classification agent, or a machine learning model 220 and correct the classification for the product grouping 230 with the selected classification when the selected classification and the currently assigned classification differ.

The classification evaluation interface module 234 may be configured to provide a graphical user interface that may be utilized by classification agents to evaluate classifications for the product groupings 230. In one example, the graphical user interface may display products included in a product grouping 230 along with a classification for the product grouping 230. Classification agents may evaluate the classification and submit changes to the classification via the graphical user interface. Submitting a change to a classification via the graphical user interface may result in an Application Programming Interface (API) call that transmits a classification update to the server 214 (which may result in updating the classification in the electronic catalog 202) and records the classification update to the update metrics 204.

The catalog accuracy estimate module 222 may be configured to calculate an accuracy estimate for the classifications used in the electronic catalog 202. In one example, a before update accuracy estimate and an after update accuracy estimate may be calculated using the update metrics 204. For example, the update metrics 204 may be used to identify inaccurate classifications prior to the classifications being updated, and to identify an improvement in classification accuracy as a result of the classifications having been updated.

In one example, the catalog accuracy estimate module 222 may be configured to calculate an accuracy estimate associated with various allocations of the product groupings 230. For example, a first accuracy estimate may be calculated for classifications of product groupings 230 allocated to trained classification agents, and a second accuracy estimate may be calculated for classifications of a sample of product groupings 230 allocated to crowd sourced classification agents. An overall accuracy estimate may be calculated based on the first accuracy estimate and the second accuracy estimate. In other examples, accuracy estimates may be calculated for fewer or additional allocations of product groupings 230 and an overall accuracy estimate may be calculated using the accuracy estimates for the addition product group allocations.

Client devices 238, 240 used by classification agents may be in communication with the server 214 via a network 236. A client device 238, 240 may include any device capable of sending and receiving data over the network 236. A client device 238, 240 may comprise, for example a processor-based system such as a computing device. A client device 238, 240 may be a device such as, but not limited to, a desktop computer, laptop or notebook computer, tablet computer, mainframe computer system, handheld computer, workstation, network computer, or other devices with like capability.

The services and modules included in the system environment 200 may be accessed using API calls, procedure calls or other network commands according to different technologies. Communication between the client devices 238, 240 and various components included in the computing service environment 200 may be performed using, but not limited to, Representational State Transfer (REST) technology or Simple Object Access Action (SOAP) technology. REST is an architectural style for distributed hypermedia systems. A RESTful API (which may also be referred to as a RESTful web service) is a web service API implemented using HTTP and REST technology. SOAP is an action for exchanging information in the context of Web-based services.

The various processes and/or other functionality contained within the system environment 200 may be executed on one or more processors 226 that are in communication with one or more memory modules 228. The system environment 200 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 236 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
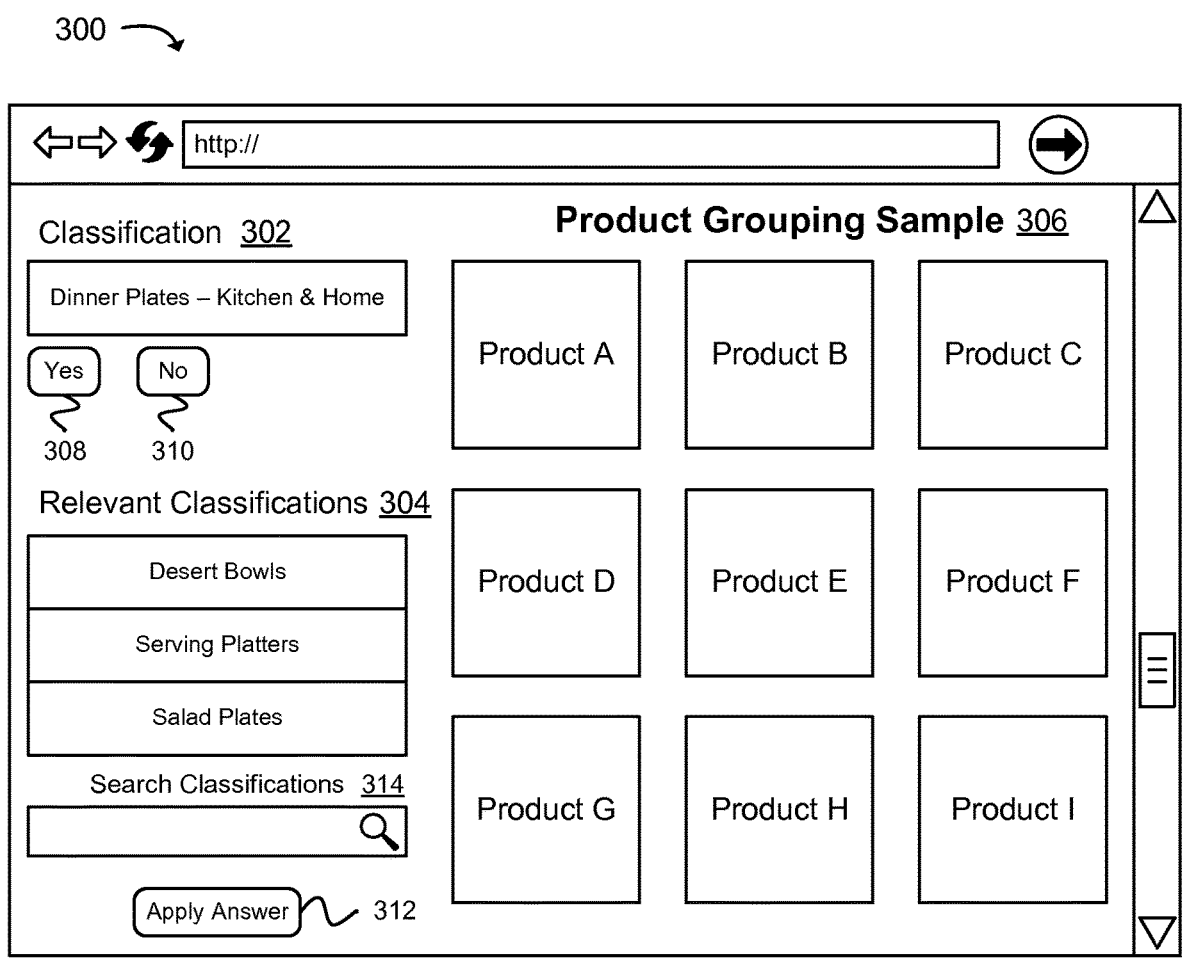
FIG. 3 is a diagram that illustrates an example graphical user interface used to evaluate and update classifications for product groupings.

FIG. 3 is a diagram that illustrates an example graphical user interface 300 that may be used by classification agents (e.g., trained and crowd sourced classification agents) to evaluate and update classifications for product groupings. As illustrated, the graphical user interface 300 may display a classification 302 for a product grouping sample 306 that includes a plurality of products. Product information for a product may be displayed enabling a classification agent to evaluate the classification 302 in association with the product information. Example product information may include a product image, title, description, manufacturer, and other relevant product information that may be used in evaluating a classification 302.

Illustratively, a classification agent may be presented with a product grouping sample 306 and a classification 302 via the graphical user interface 300. The classification agent may evaluate the product grouping sample 306 in view of the classification 302 and make a determination of whether the classification 302 accurately represents the products included in the product grouping sample 306. In the case that a determination is made that the classification 302 may be accurate, a "Yes" interface control 308 may be selected that indicates that the classification 302 is accurate. In the case that the classification 302 may be determined to be inaccurate, a "No" interface control 310 may be selected indicating that the classification is inaccurate.

In some examples, where a determination is made that the classification 302 may be inaccurate, relevant classifications 304 may be provided in the graphical user interface 300 that may be selected by a classification agent and used to update the classification for the product grouping sample 306. Illustratively, a classification agent may select a "No" interface control 310 indicating that a classification 302 may be incorrect and then select a suggested classification from the relevant classifications 304. Also, a classification search control 314 may be included in the graphical user interface 300 enabling a classification agent to search a database of classifications for a correct classification. For example, a classification agent may perform a search for a correct classification when relevant classifications 304 may not include a correct classification for a product grouping sample 306. The classification agent may then finish a classification evaluation by selecting an "Apply Answer" interface control 312.

Figure 4:
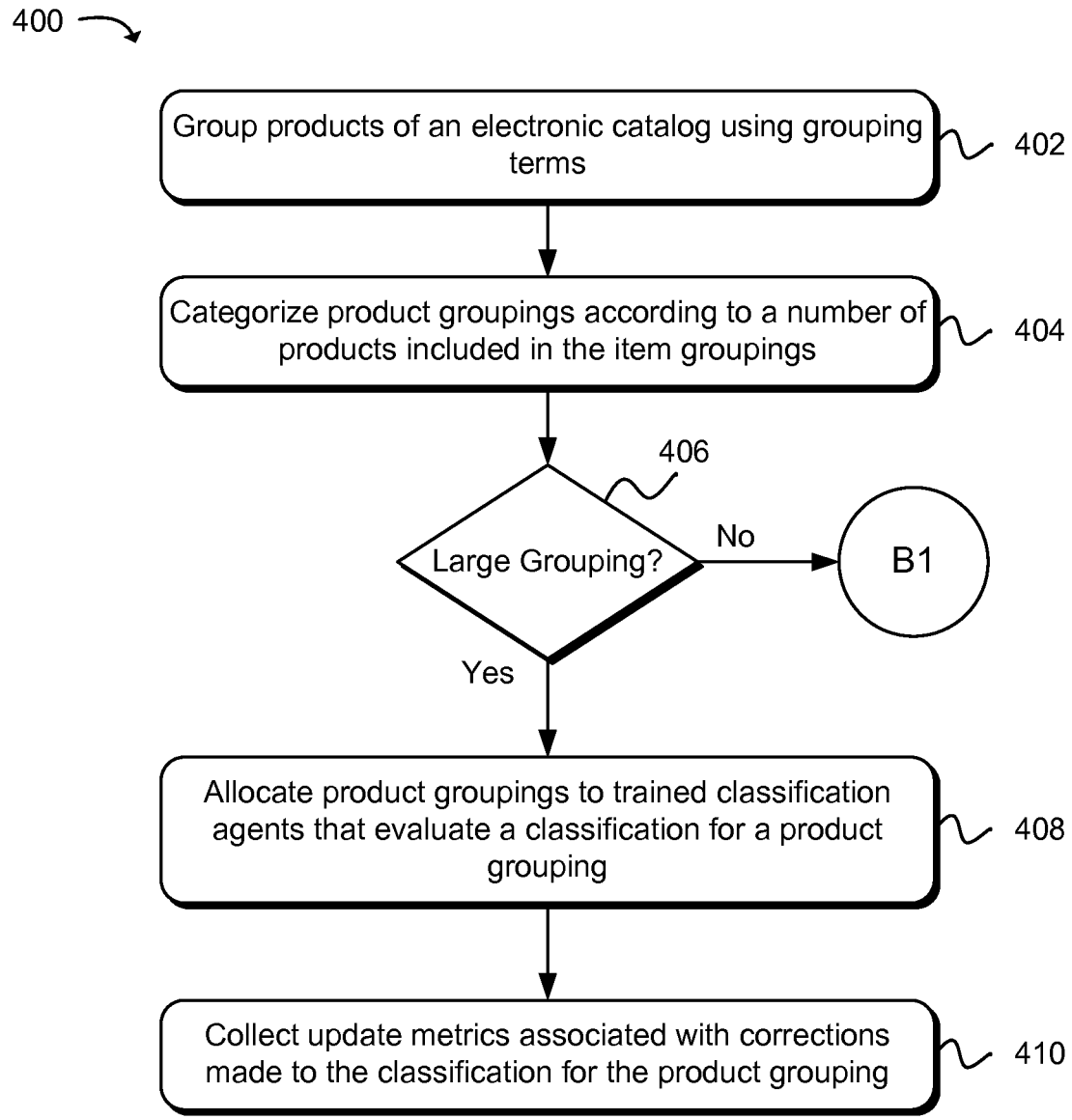
FIG. 4 is a flow diagram illustrating an example method for grouping products included in an electronic catalog into product groupings and allocating large product groupings to trained classification agents.

Moving now to FIGS. 4-8, flow diagrams illustrate example methods for allocating product groupings for evaluation and updating of classifications for the product groupings and calculating accuracy estimates based in part on feedback produced by the classification updates. FIG. 4 illustrates an example method 400 for grouping products included in an electronic catalog and allocating large product groupings to trained classification agents. Starting in block 402, products included in the electronic catalog may be grouped using grouping terms. A plurality of product groupings may be created such that each product included in the electronic catalog may be included in a product grouping.

The resulting product groupings may be of various sizes based on a membership of products included in a product grouping. As such, the product groupings, as in block 404, may be categorized according to a number of items included in a product grouping. For the purpose of this illustration, the product groupings may be categorized as large product groupings and small product groupings. Other grouping techniques may be used that result in additional grouping categorizations used to allocate product groupings. As one example, product groupings may be categorized based on an expected level of difficulty to evaluate a classification for a product grouping. Product groupings categorized as difficult may be allocated to trained classification agents and less difficult product groupings may be allocated to crowd sourced classification agents. As another example, product groupings may be categorized based on classification rankings Product groupings having a high ranking may be allocated to trained classification agents and low ranking product groupings may be allocated to crowd sourced classification agents.

Returning to FIG. 4, as in block 406, an allocation of a product grouping may be determined according to the size of the product grouping. In the case that a product grouping is categorized as a large product grouping, then as in block 408, the product grouping may be allocated to a trained classification agent that evaluates a classification for the product grouping. In the case that the product grouping may be incorrect, the classification may be updated with a classification selected by the trained classification agent. As in block 410, any corrections made to classifications for large product groups trained may be collected in update metrics. In one example, an accuracy estimate (e.g., a before update and after update accuracy estimate) for classifications of the large product groupings may be calculated based in part on the update metrics collected. The accuracy estimate may be used in calculating an overall accuracy estimate that includes accuracy estimates for small product groupings as explained later.

Figure 5:
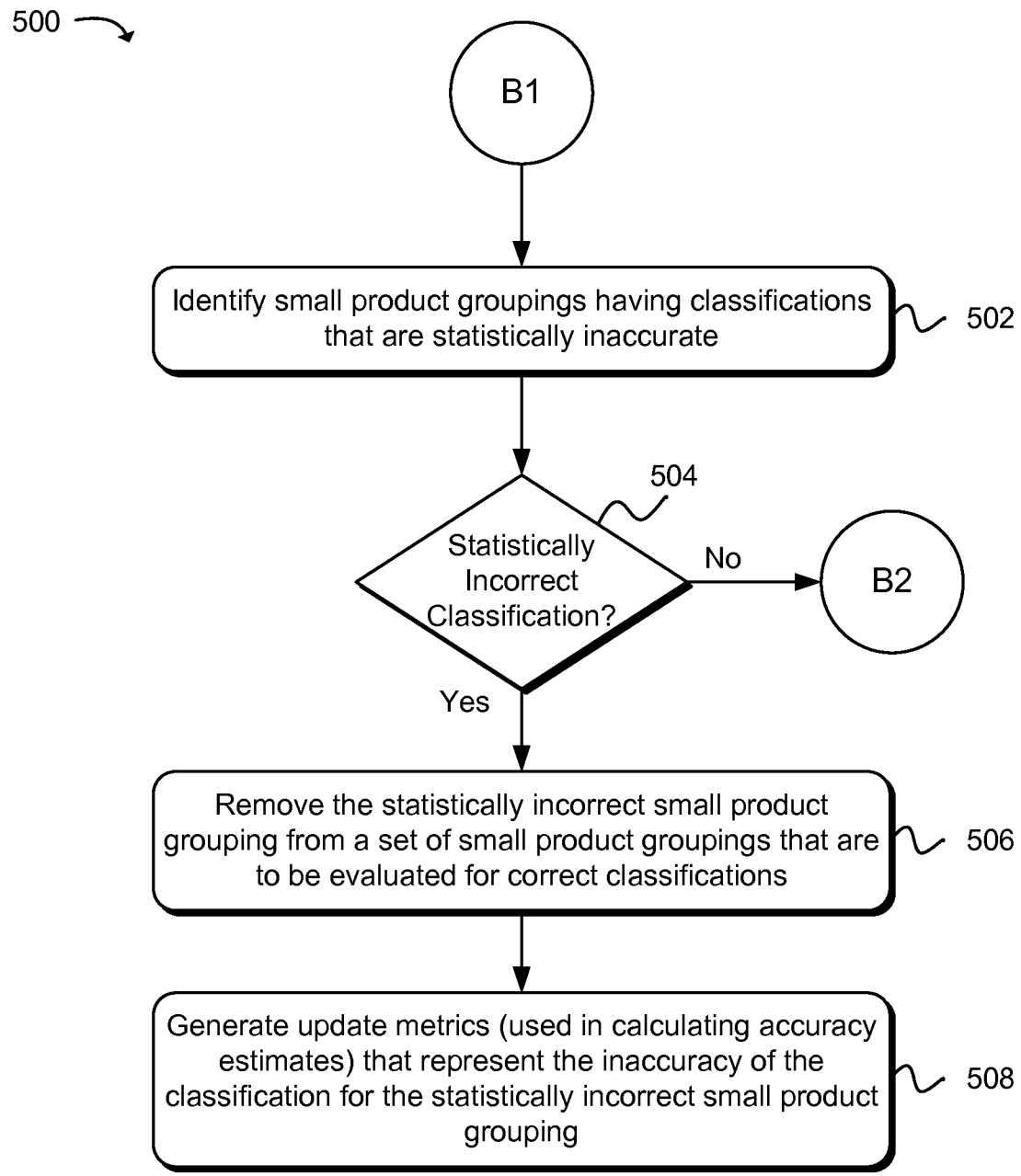
FIG. 5 is a flow diagram that illustrates an example method for identifying statistically inaccurate classifications for small product groupings selected from the product groupings of FIG. 4.

FIG. 5 illustrates an example method 500 for identifying statistically inaccurate classifications for small product groupings selected from the product groupings of FIG. 4. Starting in block 502, small product groupings that have statistically inaccurate classifications may be identified. Illustratively, the statistically incorrect small product groupings may be leaf nodes connected to a root node in a classification hierarchy, or may be small product groupings having a classification that is dissimilar to neighbor nodes in the classification hierarchy. Evaluation of the classification for these statistically incorrect small product groupings may not warrant a cost associated with sending the statistically incorrect small product groupings to a classification agent. Consequently, classifications for the statistically incorrect small product groupings may be considered statistically inaccurate classifications due to a minimal impact that the inaccurate designation has on an overall accuracy estimate for classifications included in the electronic catalog.

As in block 504, small product groupings that are identified as having classifications that are statistically inaccurate may be, as in block 506, removed from a set of small item groupings that are allocated to classification agents for evaluation of classifications. Also, as in block 508, update metrics may be generated representing the statistical inaccuracy of the classifications for the statistically incorrect small product groupings.

Figure 6:
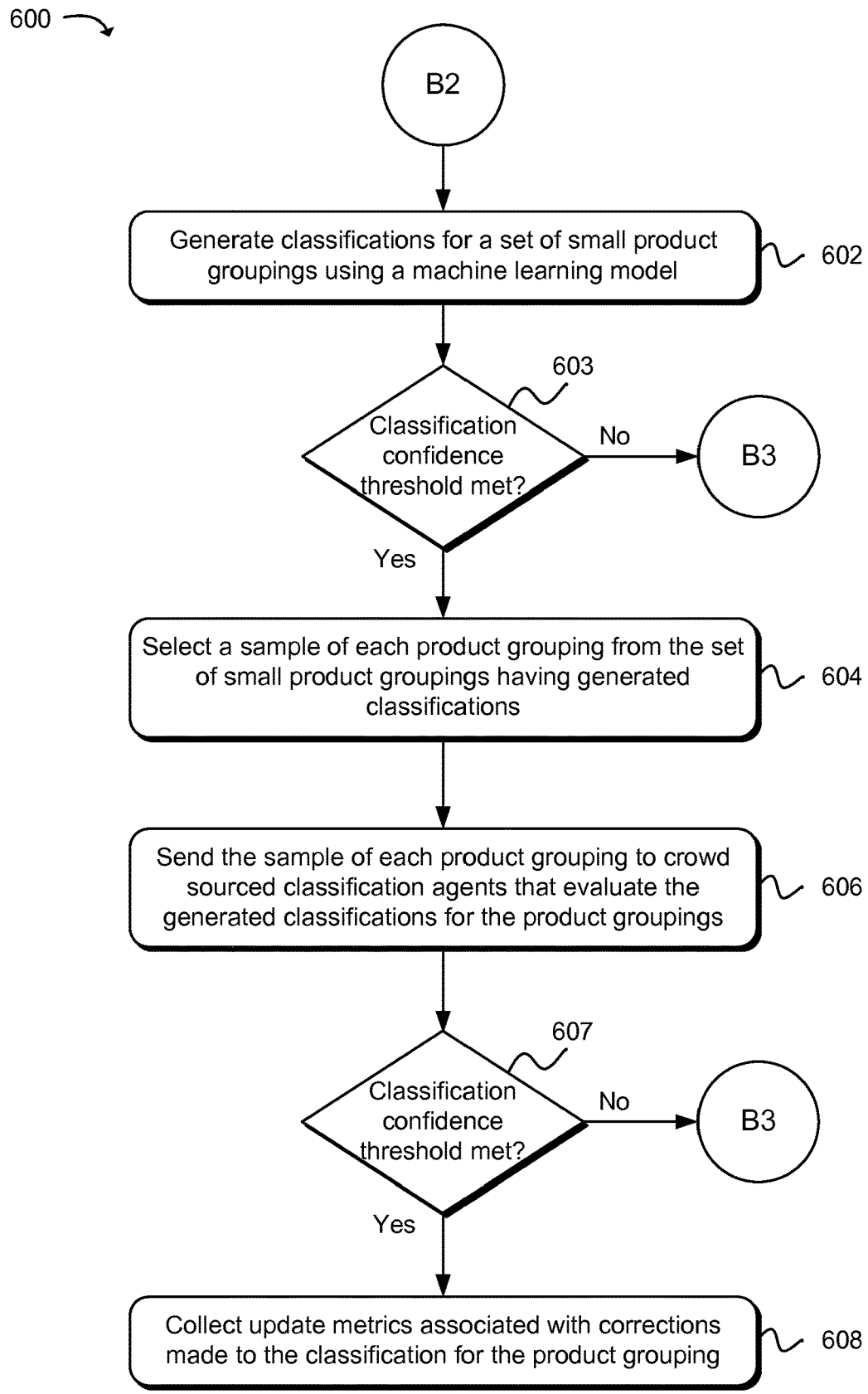
FIG. 6 is a flow diagram illustrating an example method for allocating a sample of small product groupings selected from the product groupings of FIG. 4 having machine generated classifications to crowd sourced classification agents.

FIG. 6 illustrates an example method 600 for allocating a sample of small product groupings selected from the product groupings of FIG. 4 that have been assigned machine generated classifications to crowd sourced classification agents. Starting in block 602, classifications for a set of small product groupings may be generated using a machine learning model. More specifically, a set of product groupings may be selected from product groupings that have been categorized as small product groupings. Product grouping attributes (e.g., product titles, descriptions, images, etc.) may be input to the machine learning model, which outputs generated classifications for the set of product groupings.

The correctness of classifications generated by the machine learning model may be of various confidence levels. For example, the correctness of some classifications for product groupings may be of high confidence, whereas the correctness of other classifications may be of low confidence. In one example, a correctness confidence level (e.g., a weighting) may be generated by a machine learning model along with a classification, and as in block 603, the confidence level may be compared to a confidence threshold.

In the case that a confidence threshold is met, then as in block 604, a sample of each product grouping may be selected from the set of small product groupings that have generated classifications, and as in block 606, the sample of each product grouping may be allocated to crowd sourced classification agents that evaluate the accuracy of the generated classifications for the sample of each product grouping. Illustratively, a crowd sourced classification agent may be presented with (via a graphical user interface) a product grouping (e.g., a grouping of dinnerware items) and a generated classification (e.g., dinner plates) for the product grouping. Namely, images, titles, descriptions and other information for the product grouping may be shown to the crowd sourced classification agent via a graphical user interface.

Based on the product grouping information provided, a crowd sourced classification agent may make a determination whether a generated classification accurately represents a product grouping. In the case that a crowd sourced classification agent determines that the generated classification is not accurate, then in one example, the crowd sourced classification agent may indicate (via an interface control) that the generated classification may be inaccurate. In one example, a crowd sourced classification agent may select a suggested classification, or may propose a more accurate classification of a product grouping, whereupon the generated classification may be updated with the suggested or proposed classification. In another example, a generated classification determined as inaccurate by a crowd sourced classification agent may be reviewed by a trained classification agent who may then update the generated classification with a more accurate classification.

In one example, in evaluating classifications for product groupings, the crowd sourced classification agents may indicate a classification confidence for a generated classification. As one example, a crowd sourced classification agent may indicate a high confidence, mid confidence, or a low confidence. In another example, a crowd sourced classification agent may indicate some percentage (e.g., 90%, 75%, 20%, etc.) of confidence that a classification for a product grouping is correct. As in block 607, the evaluation of classifications meeting a confidence threshold (e.g., 60%, 75%, 80%, etc.) may be stored and, as in block 608, corrections made to the generated classifications for the sample of small product groupings may be collected as update metrics. In one example, an accuracy estimate (e.g., a before update and after update accuracy estimate) for the generated classifications may be calculated based in part on the collected update metrics. The accuracy estimate may be used in calculating an overall accuracy estimate that includes accuracy estimates associated with classification updates for other allocations of product groupings.

Figure 7:
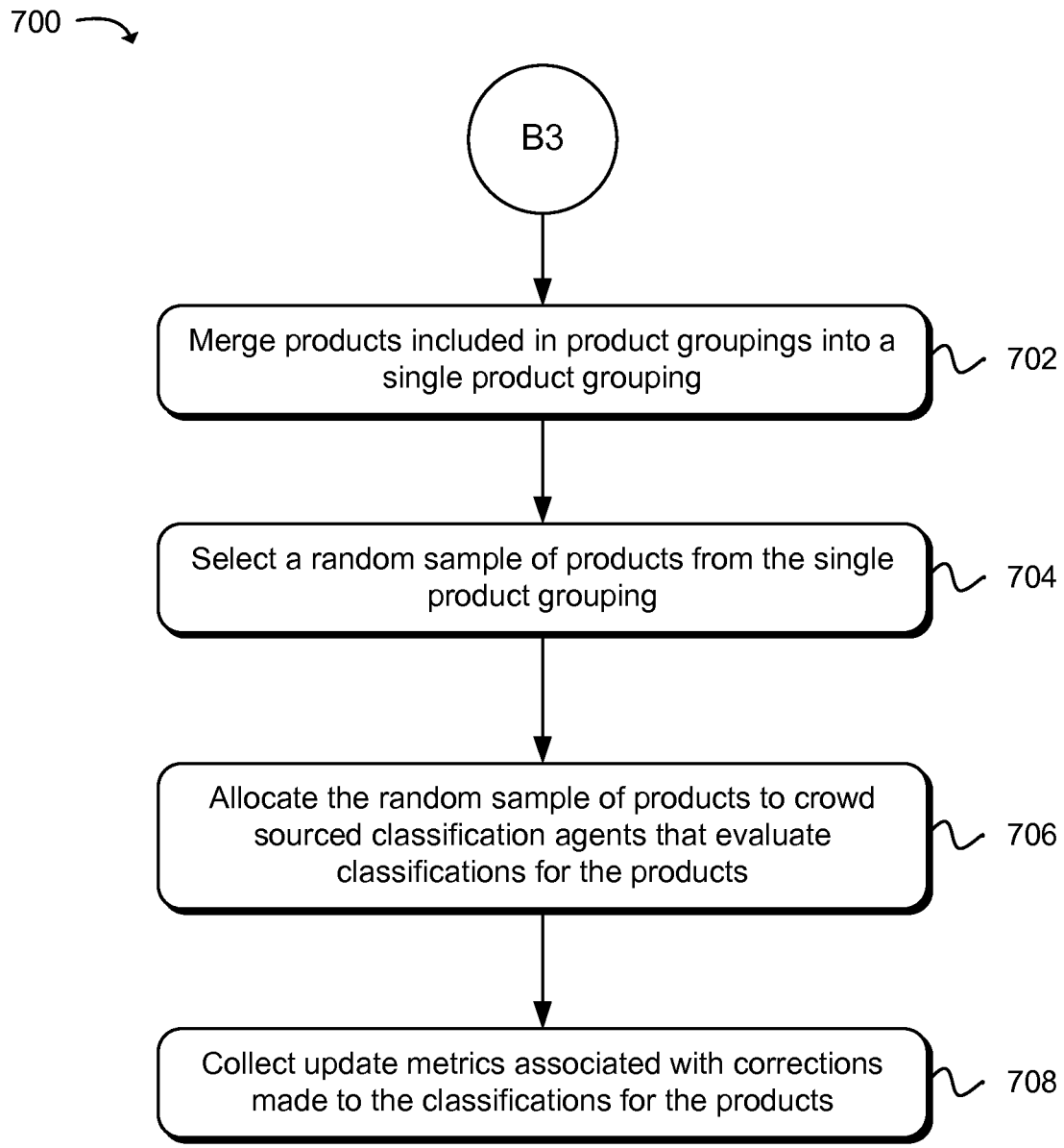
FIG. 7 is a flow diagram that illustrates an example method for allocating a sample of products to crowd sourced classification agents.

FIG. 7 illustrates an example method 700 for allocating a sample of products to crowd sourced classification agents for evaluation of classifications Starting in block 702, products included in product groupings (e.g., small product groupings) having classifications that did not meet a classification confidence threshold, and/or remainder products not included in a product grouping may be merged into a single product grouping. As in block 704, a random sample of the products may be selected from the single product grouping and, as in block 706, the random sample of product may be allocated to crowd sourced classification agents who may evaluate the accuracy of the classifications for the random sample of product utilizing a graphical user interface as described earlier.

As in block 708, update metrics associated with corrections made to the product as a result of accuracy determinations made by the crowd sourced classification agents may be collected and used in calculating an accuracy estimate (e.g., a before update and after update accuracy estimate) for the classifications. The accuracy estimate may be used in calculating an overall accuracy estimate as described in FIG. 8.

Figure 8:
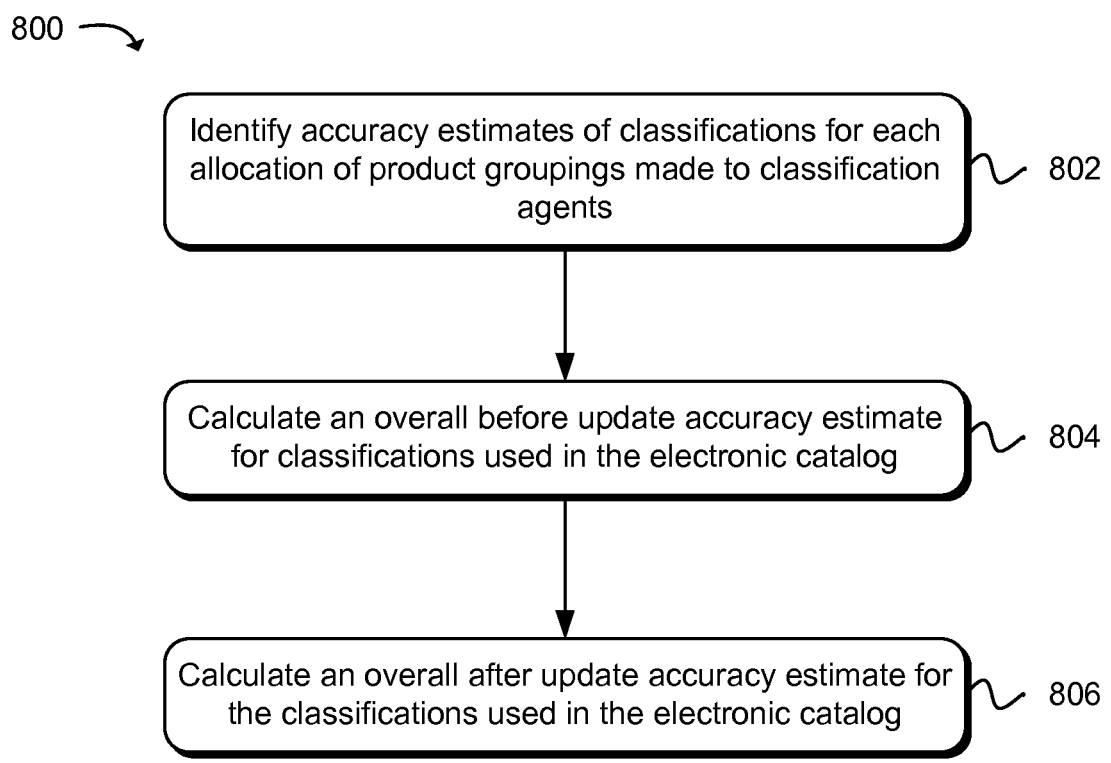
FIG. 8 is a flow diagram illustrating an example method for calculating accuracy estimates for classifications used in an electronic catalog.

FIG. 8 illustrates an example method 800 for calculating overall accuracy estimates for classifications used in an electronic catalog. Starting in block 802, accuracy estimates for classifications associated with each allocation of product groupings made to classification agents may be identified. More specifically, the accuracy estimates may be associated with the product grouping allocations described in relation to FIGS. 4-7.

In one example, the accuracy estimates may include before update accuracy estimates and after update accuracy estimates. The before update accuracy estimates may represent an accuracy of classifications for the product groupings allocated to the classification agents prior to updating inaccurate classifications. The after update accuracy estimates may represent an accuracy of the classifications after updating the inaccurate classifications.

As in block 804, an overall before update accuracy estimate may be calculated for the classifications used in the electronic catalog. For example, using the before update accuracy estimates associated with each of the product grouping allocations, an overall before update accuracy estimate may be calculated that represents an overall accuracy of classifications used in the electronic catalog prior to correcting inaccurate classifications. Also, as in block 806, an overall after update accuracy estimate may be calculated representing an overall accuracy of classifications used in the electronic catalog after inaccurate classifications have been corrected, for example, by using the after update accuracy estimates associated with each of the product grouping allocations.

FIG. 9 is a flow diagram illustrating an example method 900 for calculating accuracy estimates for classifications used in an electronic catalog. Beginning in block 910, an electronic catalog of products grouped into a plurality of product groupings using classifications may be identified, where a classification may be common among products included in a product grouping.

As in block 920, classifications of product groupings included in the plurality of product groupings may be updated with suggested classifications as a result of the classifications inaccurately representing products included in the product groupings. As in block 930, update metrics for updates made to the grouping classifications of the product groupings may be collected.

As in block 940, an accuracy estimate for the electronic catalog may be calculated where the accuracy estimate may be based at least in part on using the update metrics to identify a number of classifications that were updated representing an inaccurate portion of the electronic catalog. In some examples, a before update accuracy estimate and an after update accuracy estimate may be calculated as described earlier.

Figure 10:
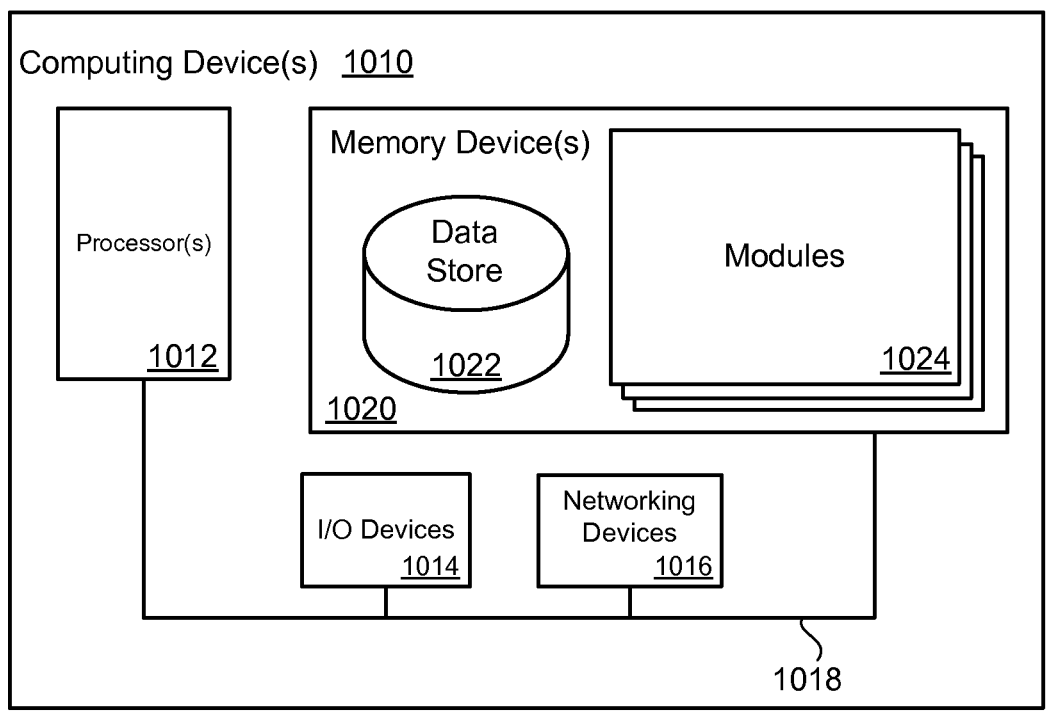
FIG. 10 is a block diagram illustrating an example of a computing device that may be used to execute a method for calculating accuracy estimates for classifications used in an electronic catalog.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules 1024 that are executable by the processor(s) 1012 and data for the modules 1024. Example modules 1024 may include a product grouping module, a statistically inaccurate module, a catalog accuracy estimate module, a classification evaluation interface module, as well as other modules. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:

group products included in an electronic catalog of products for an electronic retailer into product groupings using grouping terms, wherein the product groupings are of various grouping sizes according to a number of products in the product groupings;

associate classifications with the product groupings, wherein a classification associated with a product grouping corresponds to a product classification associated with a majority of products included in the product grouping;

categorize the product groupings into large product groupings and small product groupings according to a size of a product grouping;

select the product groupings for evaluation of the classifications associated with the product groupings, wherein the product groupings categorized as the large product groupings are transmitted to trained classification agents for evaluation, and the product groupings categorized as the small product groupings are evaluated using a classification model;

update a classification of a product grouping included in the product groupings with a suggested classification as a result of a determination that the classification does not accurately represent the products included in the product grouping;

collect update metrics for updates made to the classifications of the product groupings;

calculate a before update accuracy estimate for the electronic catalog using in part the update metrics to identify a number of classifications that were updated representing an inaccurate portion of the electronic catalog prior to the classifications being updated; and calculate an after update accuracy estimate for the electronic catalog using in part the update metrics to identify the number of classifications that were updated representing an accurate portion of the electronic catalog after the classifications were updated.

2. A non-transitory machine readable storage medium as in claim 1, wherein the instructions that when executed by the processor further:

identify statistically incorrect classifications for the product groupings having smaller grouping sizes and classifications that are dissimilar to classifications of neighbor product groupings; and include the statistically incorrect classifications in the update metrics.

3. A non-transitory machine readable storage medium as in claim 1, wherein the before update accuracy estimate and the after update accuracy estimate are an overall accuracy estimate based at least in part on a first accuracy estimate for classifications evaluated by the trained classification agents, a second accuracy estimate for classifications evaluated using the classification model, a third accuracy estimate for statistically incorrect classifications, and a fourth accuracy estimate for classifications of a random sample of remainder products.

4. A computer implemented method, comprising:

identifying an electronic catalog of products grouped into a plurality of product groupings using grouping terms, using a processor;

associating classifications with product groupings included in the plurality of product groupings, wherein a classification associated with a product grouping corresponds to a product classification associated with a majority of products included in the product grouping;

categorizing the product groupings into large product groupings and small product groupings according to a size of a product grouping, using the processor;

allocating the product groupings for evaluation of the classifications associated with the product groupings, wherein the product groupings categorized as the large product groupings are transmitted to trained classification agents for evaluation, and the product groupings categorized as the small product groupings are evaluated using a classification model;

updating the classifications of the product groupings included in the plurality of product groupings with suggested classifications, using the processor, as a result of the classifications inaccurately representing products included in the product groupings;

collecting update metrics for updates made to the classifications of the product groupings, using the processor;

calculating a before update accuracy estimate for the electronic catalog, using the processor, wherein the before update accuracy estimate is based at least in part on using the update metrics to identify a number of classifications that were updated representing an inaccurate portion of the electronic catalog prior to the classifications being updated; and calculating an after update accuracy estimate for the electronic catalog using in part the update metrics to identify the number of classifications that were updated representing an accurate portion of the electronic catalog after the classifications were updated.

5. A method as in claim 4, wherein a classification for a product grouping is evaluated to determine whether the classification accurately represents products included in the product grouping based at least in part on product titles, product descriptions, and product images.

6. A method as in claim 4, wherein collecting the update metrics for updates made to the grouping classifications further comprises recording a classification update for the product grouping made by the trained classification agent to an update record that stores the update metrics used in calculating the before update accuracy estimate and the after update accuracy estimate.

7. A method as in claim 4, wherein evaluation of the small product groupings using the classification model further comprises inputting features of the small product groupings to a machine learning model configured to classify the small product groupings into classifications.

8. A method as in claim 7, further comprising:
selecting a random sample of the small product groupings having classifications generated by the machine learning model;
allocating the random sample of the small product groupings to crowd sourced classification agents that determine whether the classifications generated by the machine learning model accurately represent products included in the small product groupings; and
recording classification updates for the random sample of the small product groupings to an update record that stores the update metrics used in calculating the before update accuracy estimate and the after update accuracy estimate.

9. A method as in claim 8, wherein the crowd sourced classification agents are humans having contracted with an electronic retailer to evaluate the classifications for the random sample of the small product groupings, wherein the crowd sourced classification agents contract with the electronic retailer using an electronic crowd sourcing marketplace.

10. A method as in claim 9, further comprising receiving classification evaluations for the random sample of the small product groupings via an Application Programming Interface (API), and the crowd sourced classification agents utilize a user interface to submit the classification evaluations that are received via the API.

11. A method as in claim 10, wherein the API is a Representational State Transfer (REST) API configured to get the random sample of the small product groupings and classifications and to post updated classifications for the random sample of the small product groupings.

12. A method as in claim 7, wherein the machine learning model configured to classify the small product groupings is a support vector machine model, a naïve Bayes model, a logistic regression model, or a decision trees model.

13. A method as in claim 7, further comprising:
identifying a product grouping included in the small product groupings having a classification determined to be dissimilar to classifications for neighbor product groupings within a data structure; and
recording the product groupings as having classifications that are inaccurate within the update metrics used in calculating the before update accuracy estimate and the after update accuracy estimate.

14. A method as in claim 4, wherein calculating the before update accuracy estimate and the after update accuracy estimate for the electronic catalog further comprises:
calculating a first accuracy estimate based at least in part on a first set of update metrics associated with classification updates for larger product groupings having a larger product membership as compared to other product groupings included in the plurality of product groupings performed by trained classification agents;
calculating a second accuracy estimate based at least in part on a second set of update metrics associated with classification updates for small product groupings having a smaller product membership as compared to other product groupings included in the plurality of product groupings performed by crowd sourced classification agents; and
calculating an overall accuracy estimate based at least in part on the first accuracy estimate and the second accuracy estimate.

15. A system comprising:
a processor;
a memory device including instructions that, when executed by the processor, cause the system to:
group products included in an electronic catalog of products into product groupings using grouping terms;
generate classifications for the product groupings using a machine learning model configured to classify the product groupings, wherein a classification generated for a product grouping corresponds to a product classification associated with a majority of products included in the product grouping;
categorize the product groupings into large product groupings and small product groupings according to a size of a product grouping, using the processor;
allocate the product groupings for evaluation of the classifications associated with the product groupings, wherein the product groupings categorized as the large product groupings are allocated to classification agents for an accuracy evaluation of the classifications ef-assigned to the large product groupings, and the product groupings categorized as the small product groupings are allocated for evaluation using a classification model;
display a classification for a large product grouping and product information for products included in the large product grouping to a classification agent, wherein the classification agent determines the accuracy of the classification to represent the large product grouping;
update the classification of the large product grouping with a suggested classification selected by the classification agent as a result of a determination that the classification inaccurately represents products included in the large product grouping;
collect update metrics for updates made to the classifications of the product groupings;
calculate a before update accuracy estimate for the electronic catalog using in part the update metrics to identify a number of classifications that were updated representing an inaccurate portion of the electronic catalog prior to the classifications being updated; and
calculate an after update accuracy estimate for the electronic catalog using in part the update metrics to identify the number of classifications that were updated representing an accurate portion of the electronic catalog after the classifications were updated.

16. A system as in claim 15, wherein the electronic catalog is grouped into the product groupings using a similarity measure that identifies products having similar customer facing product attributes.

17. A system as in claim 15, wherein the memory device includes instructions that, when executed by the processor, causes the system to execute a user interface that displays the large product grouping and the classification to the classification agent enabling the classification agent to evaluate an accuracy of the classification.

18. A system as in claim 17, wherein the memory device includes instructions that, when executed by the processor, causes the system to display in the user interface: product titles, product images, and product descriptions for products included in the large product grouping and the classification for the large product grouping.

* * * * *